United States Patent
Isaku

(10) Patent No.: US 10,946,874 B2
(45) Date of Patent: Mar. 16, 2021

(54) VEHICLE-MOUNTED EQUIPMENT CONTROL DEVICE AND VEHICLE-MOUNTED EQUIPMENT CONTROL METHOD

(71) Applicant: Mitsubishi Electric Corporation, Tokyo (JP)

(72) Inventor: Masayuki Isaku, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/635,438

(22) PCT Filed: Sep. 11, 2017

(86) PCT No.: PCT/JP2017/032627
§ 371 (c)(1),
(2) Date: Jan. 30, 2020

(87) PCT Pub. No.: WO2019/049355
PCT Pub. Date: Mar. 14, 2019

(65) Prior Publication Data
US 2020/0369289 A1 Nov. 26, 2020

(51) Int. Cl.
*B60W 50/14* (2020.01)
*B60W 40/08* (2012.01)

(52) U.S. Cl.
CPC ............ *B60W 50/14* (2013.01); *B60W 40/08* (2013.01); *B60W 2050/146* (2013.01);
(Continued)

(58) Field of Classification Search
None
See application file for complete search history.

(56) References Cited

U.S. PATENT DOCUMENTS

| 2017/0020432 A1 | 1/2017 | Kusukame et al. |
| 2019/0034847 A1* | 1/2019 | Vollbrecht ............. G08G 1/207 |
| 2019/0370579 A1* | 12/2019 | Sugawara .......... G06K 9/00335 |

FOREIGN PATENT DOCUMENTS

| CN | 206417004 U | * 8/2017 |
| JP | 2008-200486 A | 9/2008 |

(Continued)

OTHER PUBLICATIONS

International Search Report issued in PCT/JP2017/032627 (PCT/ISA/210), dated Oct. 31, 2017.
(Continued)

*Primary Examiner* — Fekadeselassie Girma
(74) *Attorney, Agent, or Firm* — Birch, Stewart, Kolasch & Birch, LLP

(57) ABSTRACT

A vehicle-mounted equipment control device includes an anti-dozing-section setting part that sets an anti-dozing section on a planned travel route of a subject vehicle, a vehicle-position acquisition part that acquires the position of the subject vehicle, a drowsiness detector that detects drowsiness of an occupant different from a driver in the subject vehicle, and a vehicle-mounted equipment controller that controls vehicle-mounted equipment. If drowsiness of the occupant has been detected when the position of the subject vehicle is within the anti-dozing section, the vehicle-mounted equipment controller controls the vehicle-mounted equipment to shake off the drowsiness. If drowsiness of the occupant has been detected when the position of the subject vehicle is outside the anti-dozing section, the vehicle-mounted equipment controller controls the vehicle-mounted equipment to promote the drowsiness.

17 Claims, 9 Drawing Sheets

(52) U.S. Cl.
CPC . *B60W 2540/221* (2020.02); *B60W 2540/227* (2020.02); *B60W 2540/229* (2020.02)

(56) References Cited

FOREIGN PATENT DOCUMENTS

| | | | |
|---|---|---|---|
| JP | 2010-68941 A | | 4/2010 |
| JP | 2010078363 A | * | 4/2010 |
| JP | 2014-113962 A | | 6/2014 |
| JP | 2015-19857 A | | 2/2015 |
| JP | 2015-130907 A | | 7/2015 |
| JP | 2016-192127 A | | 11/2016 |
| JP | 2017-110990 A | | 6/2017 |
| JP | 2017-148604 A | | 8/2017 |

OTHER PUBLICATIONS

Office Action dated Apr. 28, 2020 in corresponding Japanese Application No. 2019-540275 with an English Translation.

* cited by examiner

F I G. 2
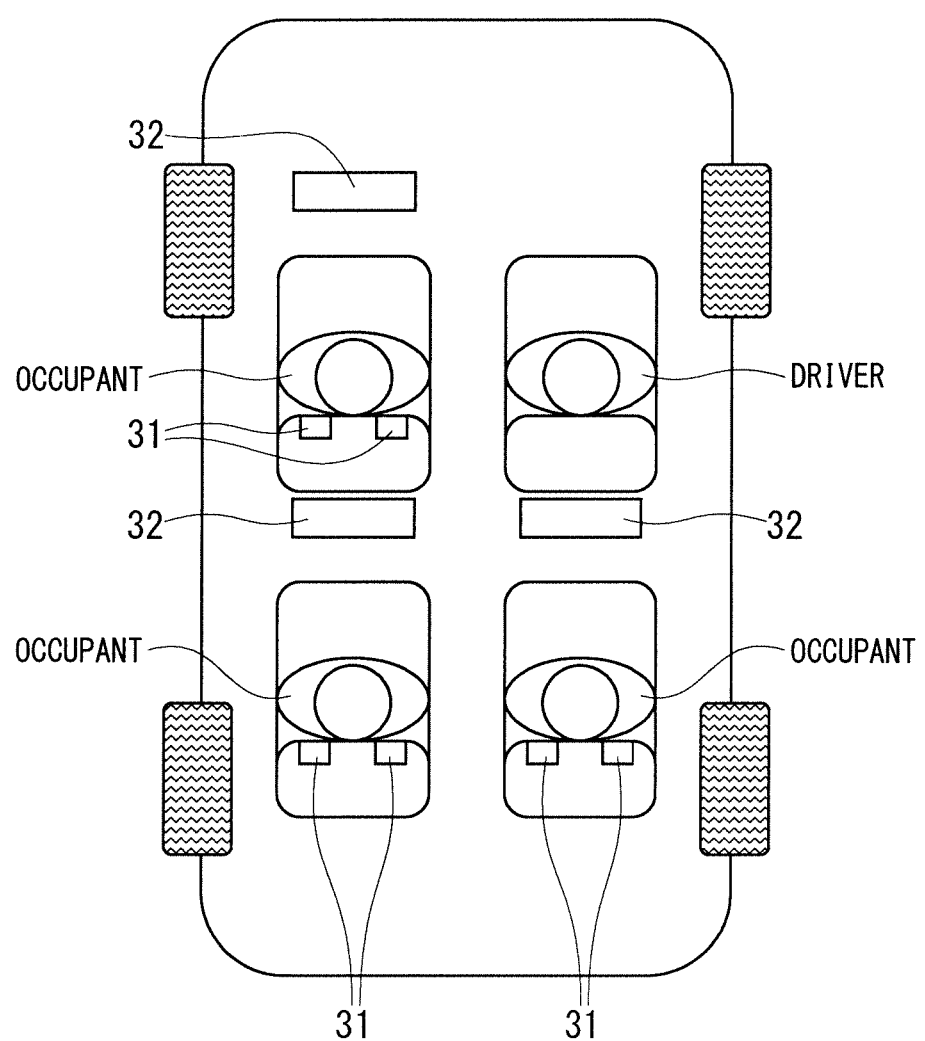

FIG. 4

| | TARGET TO BE CONTROLLED | EXAMPLES OF OPERATION DETAILS |
|---|---|---|
| DROWSINESS -PROMOTING OPERATIONS | AUDIO DEVICE | · TURN DOWN VOLUME<br>· DECREASE MUSIC TEMPO<br>  (SWITCH TO SLOWER TEMPO TUNE)<br>· SOFTEN MUSIC TONE<br>  (SWITCH TO SOFT TUNE)<br>· BRING VOLUME TO ZERO<br>  (POWER-OFF) |
| | DISPLAY DEVICE | · REDUCE SCREEN BRIGHTNESS<br>· TURN OFF SCREEN<br>  (POWER-OFF) |
| DROWSINESS -SHAKING-OFF OPERATIONS | AUDIO DEVICE | · TURN UP VOLUME<br>  (SWITCH TO TUNE WITH STRONGER TONE)<br>· INCREASE MUSIC TEMPO<br>  (SWITCH TO FASTER TEMPO TUNE)<br>· RAISE MUSIC TONE<br>  (SWITCH TO TUNE WITH STRONGER TONE)<br>· SWITCH FROM POWER-OFF TO POWER-ON |
| | DISPLAY DEVICE | · INCREASE SCREEN BRIGHTNESS<br>· PERIODICALLY SWITCH SCREEN COLOR<br>· SWITCH FROM POWER-OFF TO POWER-ON |

FIG. 10

| | TARGET TO BE CONTROLLED | EXAMPLES OF OPERATION DETAILS | |
|---|---|---|---|
| | | WHEN OCCUPANT IS IN HALF ASLEEP STATE | WHEN OCCUPANT IS IN SLEEP STATE |
| DROWSINESS-PROMOTING OPERATIONS | AUDIO DEVICE | • TURN DOWN VOLUME (SWITCH TO SOFT TUNE)<br>• DECREASE MUSIC TEMPO (SWITCH TO SLOWER TEMPO TUNE)<br>• SOFTEN MUSIC TONE (SWITCH TO SOFT TUNE) | • TURN DOWN VOLUME TO LEVEL LOWER THAN IN HALF ASLEEP STATE<br>• DECREASE MUSIC TEMPO TO LEVEL LOWER THAN IN HALF ASLEEP STATE<br>• SOFTEN MUSIC TONE TO LEVEL LOWER THAN IN HALF ASLEEP STATE<br>• BRING VOLUME TO ZERO (POWER-OFF) |
| | DISPLAY DEVICE | • REDUCE SCREEN BRIGHTNESS | • REDUCE SCREEN BRIGHTNESS TO LEVEL LOWER THAN IN HALF ASLEEP STATE<br>• TURN OFF SCREEN (POWER-OFF) |
| DROWSINESS-SHAKING-OFF OPERATIONS | AUDIO DEVICE | • TURN UP VOLUME<br>• INCREASE MUSIC TEMPO (SWITCH TO FASTER TEMPO TUNE)<br>• RAISE MUSIC TONE (SWITCH TO TUNE WITH STRONGER TONE)<br>• SWITCH FROM POWER-OFF TO POWER-ON | • TURN UP VOLUME TO LEVEL HIGHER THAN IN HALF ASLEEP STATE<br>• INCREASE MUSIC TEMPO TO LEVEL HIGHER THAN IN HALF ASLEEP STATE<br>• RAISE MUSIC TONE TO LEVEL HIGHER THAN IN HALF ASLEEP STATE |
| | DISPLAY DEVICE | • INCREASE SCREEN BRIGHTNESS<br>• PERIODICALLY SWITCH SCREEN COLOR<br>• SWITCH FROM POWER-OFF TO POWER-ON | • INCREASE SCREEN BRIGHTNESS TO LEVEL HIGHER THAN IN HALF ASLEEP STATE<br>• SWITCH SCREEN COLOR IN SHORTER CYCLES THAN IN HALF ASLEEP STATE |

VEHICLE-MOUNTED EQUIPMENT CONTROL DEVICE AND VEHICLE-MOUNTED EQUIPMENT CONTROL METHOD

TECHNICAL FIELD

The present invention relates to a technique for controlling equipment mounted on a vehicle (vehicle-mounted equipment) to control drowsiness of occupants in the vehicle.

BACKGROUND ART

Driving a vehicle requires a driver to stay awake, but occupants other than the driver may in some cases get some sleep in the vehicle. For example, Patent Document 1 discloses a vehicle-mounted equipment control device that, upon detecting drowsiness of an occupant other than a driver, causes vehicle-mounted equipment to perform operations suitable for the occupant to get to sleep.

PRIOR ART DOCUMENT

Patent Document

Patent Document 1: Japanese Patent Application Laid-Open No. 2010-068941

SUMMARY

Problem to be Solved by the Invention

The technique of Patent Document 1 is intended to perform only operations for promoting drowsiness of occupants, but it is conceivable that, depending on the situation, promoting drowsiness may be against the intentions of occupants. For example, most occupants want to be awake when the vehicle is approaching locations such as a destination point, stopping-off sites, and tourist spots.

The present invention has been made in order to solve problems as described above, and it is an object of the present invention to provide a vehicle-mounted equipment control device capable of promoting or shaking off drowsiness of occupants depending on the situation.

Means to Solve the Problem

A vehicle-mounted equipment control device according to the present invention includes an anti-dozing-section setting part that sets an anti-dozing section on a planned travel route of a subject vehicle, a vehicle-position acquisition part that acquires a position of the subject vehicle, a drowsiness detector that detects drowsiness of an occupant different from a driver in the subject vehicle, and a vehicle-mounted equipment controller that, if drowsiness of the occupant has been detected when the position of the subject vehicle is within the anti-dozing section, controls vehicle-mounted equipment to shake off the drowsiness, and if drowsiness of the occupant has been detected when the position of the subject vehicle is outside the anti-dozing section, controls the vehicle-mounted equipment to promote the drowsiness.

Effects of the Invention

According to the present invention, it is possible to promote drowsiness of occupants when the position of the subject vehicle is outside the anti-dozing sections and to shake off drowsiness of occupants when the position of the subject vehicle is within the anti-dozing sections. For example, the anti-dozing sections are set upstream of locations such as a destination point, stopping-off sites, and tourist spots where occupants want to be awake. This prevents drowsiness of occupants from being promoted against the intentions of the occupants.

These and other objects, features, aspects and advantages of the present invention will become more apparent from the following detailed description of the present invention when taken in conjunction with the accompanying drawings.

BRIEF DESCRIPTION OF DRAWINGS

FIG. 2 illustrates an arrangement example of vehicle-mounted equipment (audio devices and display devices);

FIG. 4 illustrates examples of drowsiness-promoting operations and drowsiness-shaking-off operations;

FIG. 10 illustrates examples of the drowsiness-promoting operations and the drowsiness-shaking-off operations according to Embodiment 3.

DESCRIPTION OF EMBODIMENTS

Embodiment 1

Figure 1:
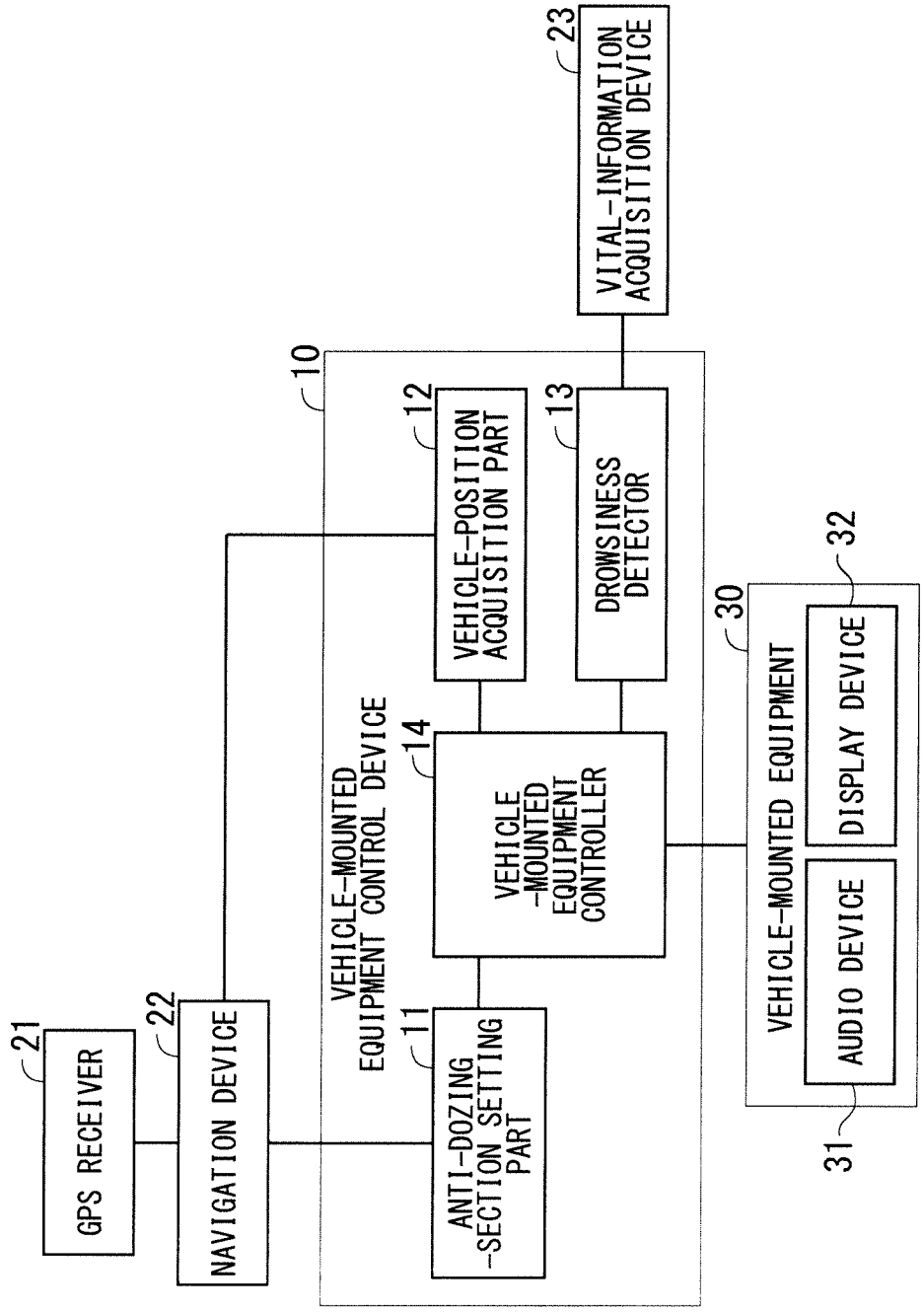
FIG. 1 illustrates a configuration of a vehicle-mounted equipment control system according to Embodiment 1.

FIG. 1 illustrates a configuration of a vehicle-mounted equipment control system according to Embodiment 1. The system includes a vehicle-mounted equipment control device 10, a global positioning system (GPS) receiver 21, a navigation device 22, a vital-information acquisition device 23, and vehicle-mounted equipment 30. A vehicle in which this system is installed is hereinafter referred to as a "subject vehicle." Also, "occupants" refer to occupants other than a driver, unless otherwise mentioned.

The GPS receiver 21 receives a positioning signal from a GPS satellite and calculates the position (latitude and longitude) of the subject vehicle on the basis of the received positioning signal.

The navigation device 22 uses map information and the position of the subject vehicle calculated by the GPS receiver 21 to locate the position of the subject vehicle on a map, and searches for a route from the current location of the subject vehicle to a destination point and sets the detected route as a planned travel route of the subject vehicle. The navigation device 22 also guides the driver of the subject vehicle along the route so that the subject vehicle can travel along the planned travel route. In the present embodiment, the navigation device 22 is used as means for providing the planned travel route of the subject vehicle to the vehicle-mounted equipment control device 10. Instead of the navigation device 22, other devices capable of creating a planned travel route of the subject vehicle may be used (e.g., an external server capable of communicating with the vehicle-mounted equipment control device 10).

The vital-information acquisition device 23 includes cameras and sensors that acquire vital information such as eye movements, eyelid movements, pulse, and brain waves of each occupant in the subject vehicle. It is sufficient for the vital information to include only information that can be used to determine the level of wakefulness of the occupants, more specifically, whether the occupants are drowsy. In the present embodiment, the vital information is assumed to include at least one of the eye movements, eyelid movements, pulses, and brain waves of the occupants.

The vehicle-mounted equipment 30 includes audio devices 31 that output sounds, and display devices 32 that display images. The audio devices 31 and the display devices 32 are usually used in applications such as replaying media, watching a TV or listening to a radio, or displaying the map of the navigation device 22. In the present embodiment, these devices are also used in applications for controlling drowsiness of occupants, in addition to the aforementioned usual applications.

FIG. 2 illustrates an arrangement example of the audio devices 31 and the display devices 32 in the subject vehicle. As illustrated in FIG. 2, the audio devices 31 are each disposed in the vicinity of the headrest of each occupant's seat so as to be capable of providing sounds for each occupant. The display devices 32 are each disposed in front of each occupant's seat so as to be capable of providing images for each occupant. It is sufficient for the audio devices 31 and the display devices 32 to provide sounds and images for each occupant; therefore, for example, the audio devices 31 may be headphones, and the display devices 32 may be head-mounted displays.

Referring back to the description of FIG. 1, the vehicle-mounted equipment control device 10 includes an anti-dozing-section setting part 11, a vehicle-position acquisition part 12, a drowsiness detector 13, and a vehicle-mounted equipment controller 14.

Figure 3:
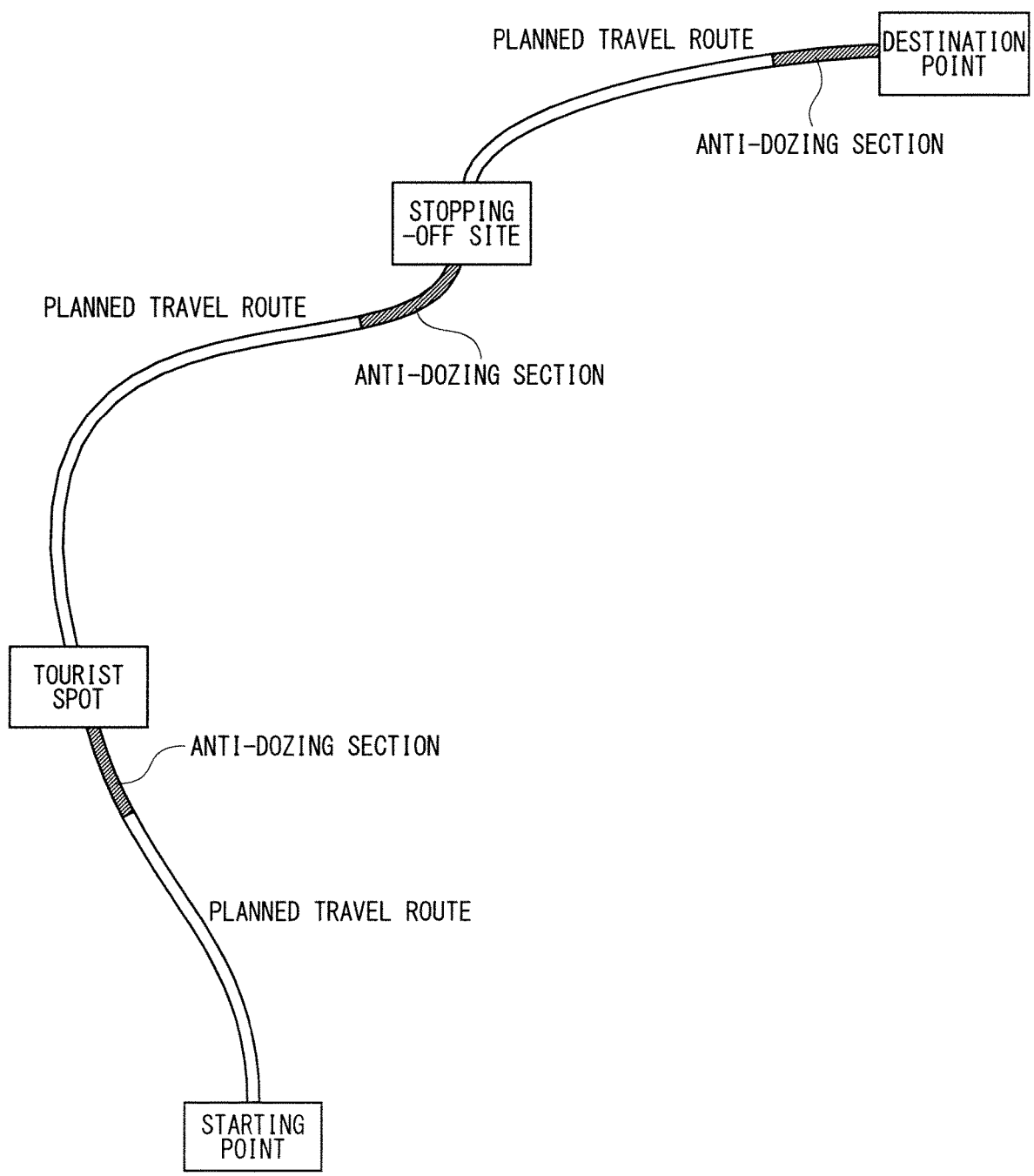
FIG. 3 illustrates an example of the setting of anti-dozing sections.

The anti-dozing-section setting part 11 acquires information on the planned travel route of the subject vehicle from the navigation device 22 and sets anti-dozing sections on the planned travel route, the anti-dozing sections being sections where the occupants are prevented from falling asleep. In the present embodiment, as illustrated in FIG. 3, the anti-dozing sections to be set by the anti-dozing-section setting part 11 are assumed to include a given length of section located immediately upstream of each tourist spot, a given length of section located immediately upstream of each stopping-off site, and a given length of section located immediately upstream of the destination point, on the planned travel route. The locations of the anti-dozing sections are, however, not limited to the examples illustrated in FIG. 3, and may be set at any place depending on the driver's or occupants' request.

The lengths of the anti-dozing sections may be set based on distance, or may be set based on the travel time of the subject vehicle. For example, in the case where an anti-dozing section is set immediately upstream of the destination, the starting point of the anti-dozing section may be a point that is located at a given distance upstream of the destination, or may be a point that the subject vehicle reaches a given period of time early before the destination.

The vehicle-position acquisition part 12 acquires information on the position of the subject vehicle from the navigation device 22. The vehicle-position acquisition part 12 may acquire positional information on the subject vehicle from the GPS receiver 21, but from the viewpoint of compatibility with the planned travel route that the anti-dozing-section setting part 11 acquires from the navigation device 22, it is preferable to acquire positional information that has undergone map matching processing performed by the navigation device 22.

The drowsiness detector 13 acquires vital information such as eye movements, eyelid movements, pulse, and brain waves of each occupant from the vital-information acquisition device 23 and detects drowsiness of each occupant on the basis of the acquired vital information.

The vehicle-mounted equipment controller 14 controls the vehicle-mounted equipment 30 so as to control drowsiness of each occupant in the subject vehicle on the basis of the anti-dozing sections set by the anti-dozing-section setting part 11, the position of the subject vehicle acquired by the vehicle-position acquisition part 12, and the result of detecting drowsiness of each occupant acquired by the drowsiness detector 13. Specifically, if drowsiness of an occupant has been detected when the position of the subject vehicle is within the anti-dozing sections, the vehicle-mounted equipment controller 14 controls the vehicle-mounted equipment 30 to shake off the drowsiness of the occupant. If drowsiness of an occupant has been detected when the position of the subject vehicle is outside the anti-dozing sections, the vehicle-mounted equipment controller 14 controls the vehicle-mounted equipment 30 to promote the drowsiness of the occupant. While the drowsiness detector 13 does not detect drowsiness of any occupant, the vehicle-mounted equipment controller 14 does not control the vehicle-mounted equipment 30, and the vehicle-mounted equipment 30 operates in accordance with occupants' operations.

The operation of the vehicle-mounted equipment 30 promoting the drowsiness of occupants is hereinafter referred to as a "drowsiness-promoting operation," and the operation of the vehicle-mounted equipment 30 shaking off the drowsiness of occupants is referred to as a "drowsiness-shaking-off operation." FIG. 4 illustrates specific examples of the drowsiness-promoting operation and the drowsiness-shaking-off operation.

As illustrated in FIG. 4, conceivable examples of the drowsiness-promoting operation performed by the audio devices 31 include turning down the volume of output sounds, decreasing the tempo of the playing music, and softening the tone of the playing music. Turning down the volume includes bringing the volume to zero and powering off the audio devices 31. Decreasing the tempo of the music includes switching the playing tune to a slower tempo tune. Softening the tone of the music includes switching the playing tune to a tune with a softer tone.

Conceivable examples of the drowsiness-promoting operation performed by the display devices 32 include reducing the brightness of the screen. Reducing the brightness includes turning off the screen (turning the screen to black display) and powering off the display devices 32.

Conceivable examples of the drowsiness-shaking-off operation performed by the audio devices 31 include turning up the volume of output sounds, increasing the tempo of the playing music, and raising the tone of the playing music. Turning up the volume includes powering on the audio devices 31 that are in the off state. Increasing the tempo of the music includes switching the playing tune to a faster tempo tune. Raising the tone of the music includes switching the music to a tune with a stronger tone.

Conceivable examples of the drowsiness-shaking-off operation performed by the display devices 32 include increasing the brightness of the screen. Increasing the brightness includes powering on the display devices 32 that are in the off state. Examples of the drowsiness-shaking-off operation also include periodically switching the screen colors of the display devices 32.

Figure 5:
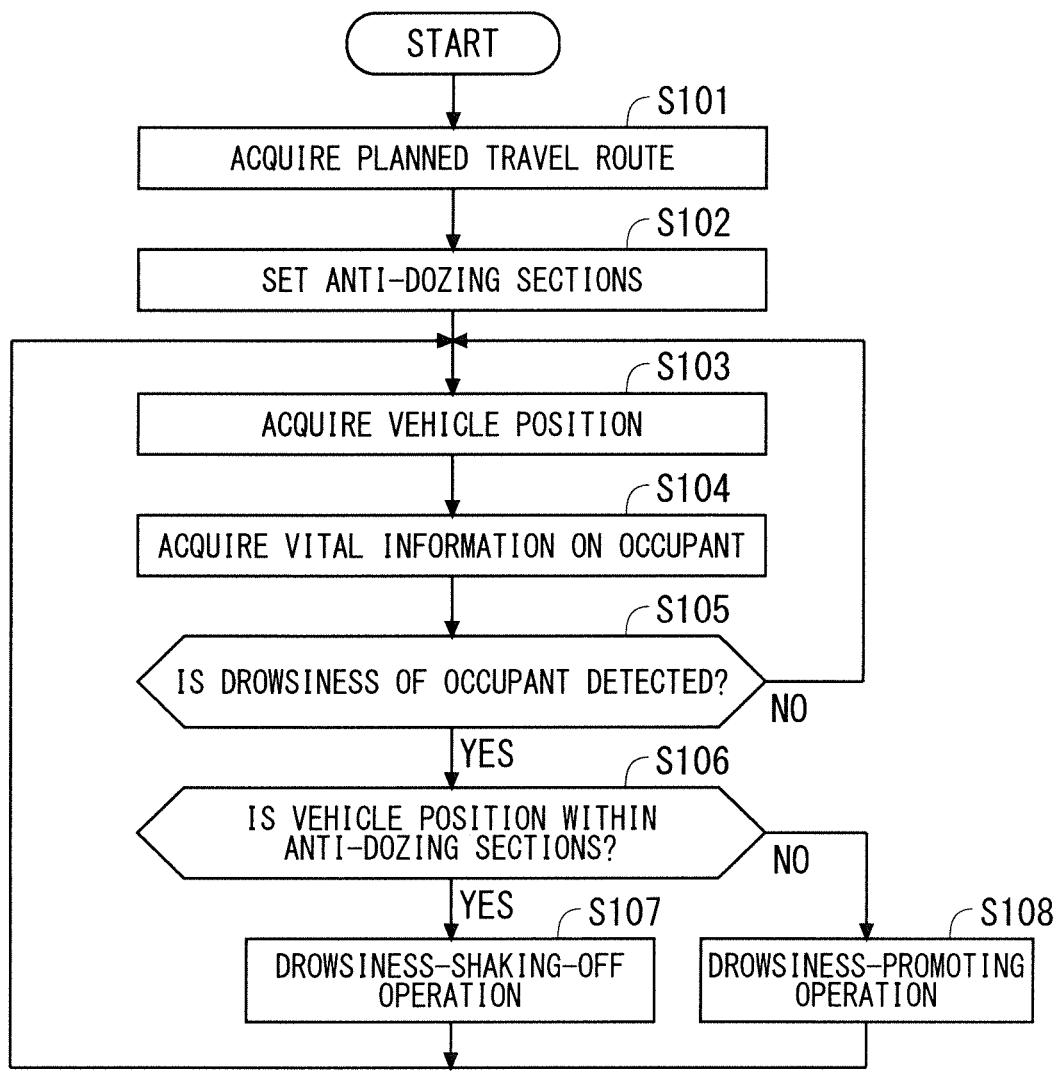
FIG. 5 is a flowchart illustrating operations of the vehicle-mounted equipment control device according to Embodiment 1.

FIG. 5 is a flowchart illustrating operations of the vehicle-mounted equipment control device 10 according to Embodiment 1. The operations of the vehicle-mounted equipment control device 10 will be described hereinafter with reference to FIG. 5. To simplify the description, it is assumed here that the number of occupants is one.

In the vehicle-mounted equipment control device 10, the flowchart in FIG. 5 is started when the navigation device 22 has determined the planned travel route of the subject vehicle. First, the anti-dozing-section setting part 11 acquires the planned travel route from the navigation device 22 (step S101). The anti-dozing-section setting part 11 then sets anti-dozing sections on the planned travel route (step S102).

Next, the vehicle-position acquisition part 12 acquires the position of the subject vehicle from the navigation device 22 (step S103). The drowsiness detector 13 acquires vital information on the occupant from the vital-information acquisition device 23 (step S104).

On the basis of the vital information on the occupant, the drowsiness detector 13 determines whether the occupant is drowsy (step S105). At this time, if drowsiness of the occupant has not been detected (NO in step S105), the procedure returns to step S103, and steps S103 to S105 are repeatedly executed.

On the other hand, if drowsiness of the occupant has been detected (YES in step S105), the vehicle-mounted equipment controller 14 compares the position of the subject vehicle acquired in step S103 with the locations of the anti-dozing sections set in step S102 to determine whether the position of the subject vehicle is within the anti-dozing sections (step S106). At this time, if the position of the subject vehicle is within the anti-dozing sections (YES in step S106), the vehicle-mounted equipment controller 14 causes the vehicle-mounted equipment 30 to perform drowsiness-shaking-off operations in order to shake off the drowsiness of the occupant (step S107). However, if the position of the subject vehicle is outside the anti-dozing sections (NO in step S106), the vehicle-mounted equipment controller 14 causes the vehicle-mounted equipment 30 to perform drowsiness-promoting operations in order to promote the drowsiness of the occupant (step S108).

After step S107 or S108, the procedure returns to step S103. The operations of steps S103 to S108 are repeatedly executed until the subject vehicle reaches the destination point. Although not illustrated in FIG. 5, for example in the case where the navigation device 22 has changed the planned travel route, the procedure returns to step S101 and resumes the processing.

In the case where there are a plurality of occupants, the processing of steps S103 to S108 described above is performed for each occupant.

As described above, if drowsiness of an occupant has been detected when the position of the subject vehicle is outside the anti-dozing sections, the vehicle-mounted equipment control device 10 according to Embodiment 1 controls the vehicle-mounted equipment 30 to promote the drowsiness of the occupant. On the other hand, if drowsiness of an occupant has been detected when the position of the subject vehicle is within the anti-dozing sections, the vehicle-mounted equipment control device 10 controls the vehicle-mounted equipment 30 to shake off the drowsiness of the occupant. Accordingly, if the anti-dozing sections are set upstream of locations such as the destination point, stopping-off sites, and tourist spots as in the example illustrated in FIG. 3, it is possible to prevent the drowsiness of occupants from being promoted against the intentions of the occupants.

Figure 6:
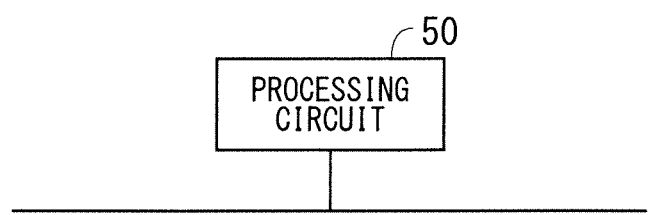
FIG. 6 illustrates an example of a hardware configuration of the vehicle-mounted equipment control device.
Figure 7:
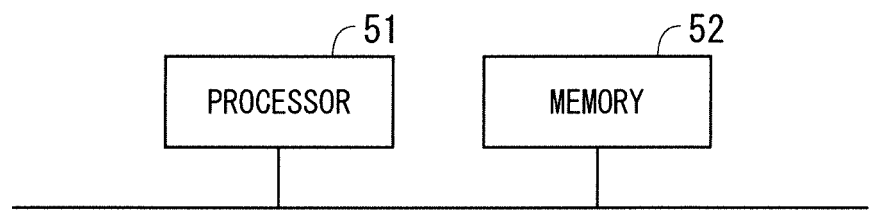
FIG. 7 illustrates another example of the hardware configuration of the vehicle-mounted equipment control device.

FIGS. 6 and 7 illustrate examples of a hardware configuration of the vehicle-mounted equipment control device 10. Each constituent element of the vehicle-mounted equipment control device 10 illustrated in FIG. 1 is implemented by, for example, a processing circuit 50 illustrated in FIG. 6. That is, the processing circuit 50 includes the anti-dozing-section setting part 11 that sets anti-dozing sections on the planned travel route of the subject vehicle, the vehicle-position acquisition part 12 that acquires the position of the subject vehicle, the drowsiness detector 13 that detects drowsiness of occupants other than the driver in the subject vehicle, and the vehicle-mounted equipment controller 14 that, if drowsiness of an occupant has been detected when the position of the subject vehicle is within the anti-dozing sections, controls the vehicle-mounted equipment to shake off the drowsiness of the occupant, and if drowsiness of an occupant has been detected when the position of the subject vehicle is outside the anti-dozing sections, controls the vehicle-mounted equipment to promote the drowsiness of the occupant. The processing circuit 50 may apply dedicated hardware, or may apply a processor that executes programs stored in a memory (also referred to as a central processing unit (CPU), a processing device, an arithmetic unit, a microprocessor, a microcomputer, or a digital signal processor (DSP)).

In the case where the processing circuit 50 applies dedicated hardware, the processing circuit 50 corresponds to, for example, a single circuit, a composite circuit, a programmed processor, a parallel-programmed processor, an application specific integrated circuit (ASIC), a field-programmable gate array (FPGA), or a circuit that combines these. The functions of each constituent element of the vehicle-mounted equipment control device 10 may be implemented by a plurality of processing circuits, or these functions may be implemented all together by a single processing circuit.

FIG. 7 illustrates a hardware configuration of the vehicle-mounted equipment control device 10 when the processing circuit 50 is configured using a processor. In this case, the functions of each constituent element of the vehicle-mounted equipment control device 10 are implemented by a combination of software and similar systems (i.e., software, firmware, or a combination of software and firmware). The software and similar systems are described in the forms of a program and stored in a memory 52. The processor 51 serving as the processing circuit 50 implements the functions of each part by reading out and executing the program stored in the memory 52. That is, when implemented by the processing circuit 50, the vehicle-mounted equipment control device 10 includes the memory 52 for storing a program that eventually executes processing for setting anti-dozing sections on the planned travel route of the subject vehicle, processing for acquiring the position of the subject vehicle, processing for detecting drowsiness of occupants other than the driver in the subject vehicle, processing for, if drowsiness of an occupant has been detected when the position of the subject vehicle is within the anti-dozing sections, controlling the vehicle-mounted equipment to shake off the drowsiness of the occupant, and processing for, if drowsiness of an occupant has been detected when the position of the subject vehicle is outside the anti-dozing sections, controlling the vehicle-mounted equipment to promote the drowsiness of the occupant. In other words, it can be said that this program causes a computer to execute a procedure or method of operations of each constituent element of the vehicle-mounted equipment control device 10.

The memory 52 as used herein may, for example, be a nonvolatile or volatile semiconductor memory such as a random access memory (RAM), a read only memory (ROM), a flash memory, an erasable programmable read only memory (EPROM), or an electrically erasable programmable read only memory (EEPROM); a hard disk drive (HDD); any type of external storage and its drive unit, such as a magnetic disk, a flexible disk, an optical disk, a compact disk, a mini disc, or a digital versatile disc (DVD); or any other possible storage medium that may be used in the future.

In the above embodiment, a description is given of the configuration in which the functions of each constituent element of the vehicle-mounted equipment control device 10 are implemented by either hardware or software and similar systems. The present invention is, however, not limited to the above description, and a configuration is also possible in which some constituent elements of the vehicle-mounted equipment control device 10 are implemented by dedicated hardware, and some other constituent elements are implemented by software and similar systems. For example, the functions of some constituent elements may be implemented by the processing circuit 50 serving as dedicated hardware, and the functions of some other constituent elements may be implemented by the processing circuit 50 serving as the processor 51 and reading out and executing the program stored in the memory 52.

As described thus far, the vehicle-mounted equipment control device 10 can achieve the aforementioned functions with hardware, software and similar systems, or a combination of hardware and software and similar systems.

Embodiment 2

Figure 8:
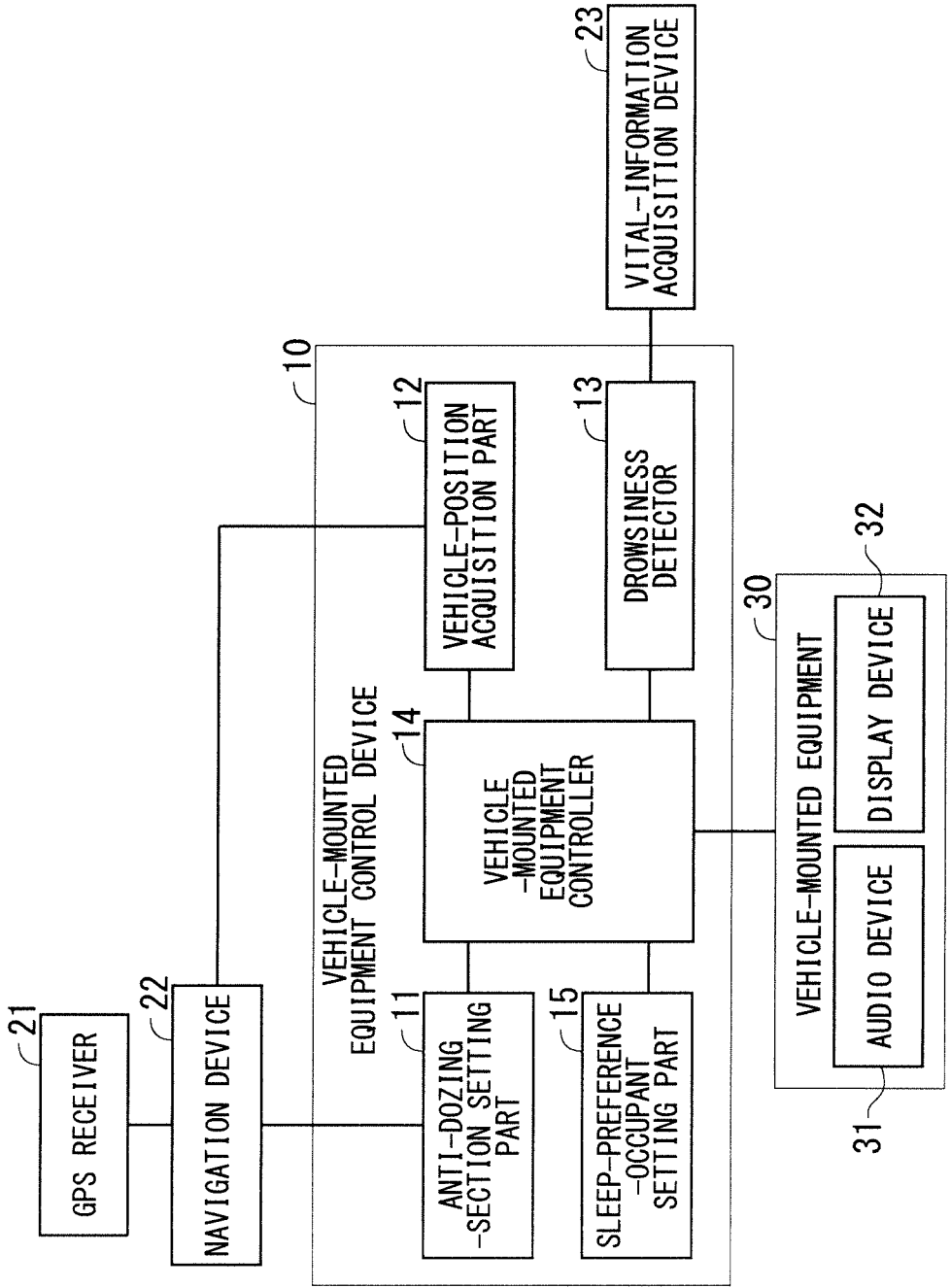
FIG. 8 illustrates a configuration of a vehicle-mounted equipment control system according to Embodiment 2.

FIG. 8 illustrates a configuration of a vehicle-mounted equipment control system according to Embodiment 2. The configuration of the vehicle-mounted equipment control system in FIG. 8 differs from the configuration in FIG. 1 in that the vehicle-mounted equipment control device 10 further includes a sleep-preference-occupant setting part 15. The sleep-preference-occupant setting part 15 is capable of setting an occupant whose drowsiness does not necessarily have to be shaken off (occupant who is excluded from targets for the drowsiness-shaking-off operation) as a "sleep preference occupant."

In the case where drowsiness of an occupant has been detected, the vehicle-mounted equipment controller 14 according to the present embodiment determines whether the occupant is a sleep preference occupant, and if the occupant is a sleep preference occupant, causes the vehicle-mounted equipment 30 to perform drowsiness-promoting operations, irrespective of whether the position of the subject vehicle is within or outside the anti-dozing sections.

The sleep-preference-occupant setting part 15 may use an arbitrary method to set sleep preference occupants. Conceivable examples of the method include registering occupants who are to be set as sleep preference occupants through the user's (driver's or occupant's) operation of the vehicle-mounted equipment control device 10, and specifying seats in which sleep preference occupants may sit. A method is also possible in which the sleep-preference-occupant setting part 15 automatically selects occupants who are to be registered as sleep preference occupants on the basis of pre-registered occupant information (e.g., age and sex). As another alternative, a method is conceivable in which the sleep-preference-occupant setting part 15 checks the physical condition of each occupant on the basis of the vital information on the occupant (e.g., body temperature and heart rate) acquired by the vital-information acquisition device 23, and registers occupants determined as being in poor physical condition, as sleep preference occupants. As yet another alternative, the sleep-preference-occupant setting part 15 may detect a situation of installation of child seats in the subject vehicle and automatically register occupants who use the child seats as sleep preference occupants.

Figure 9:
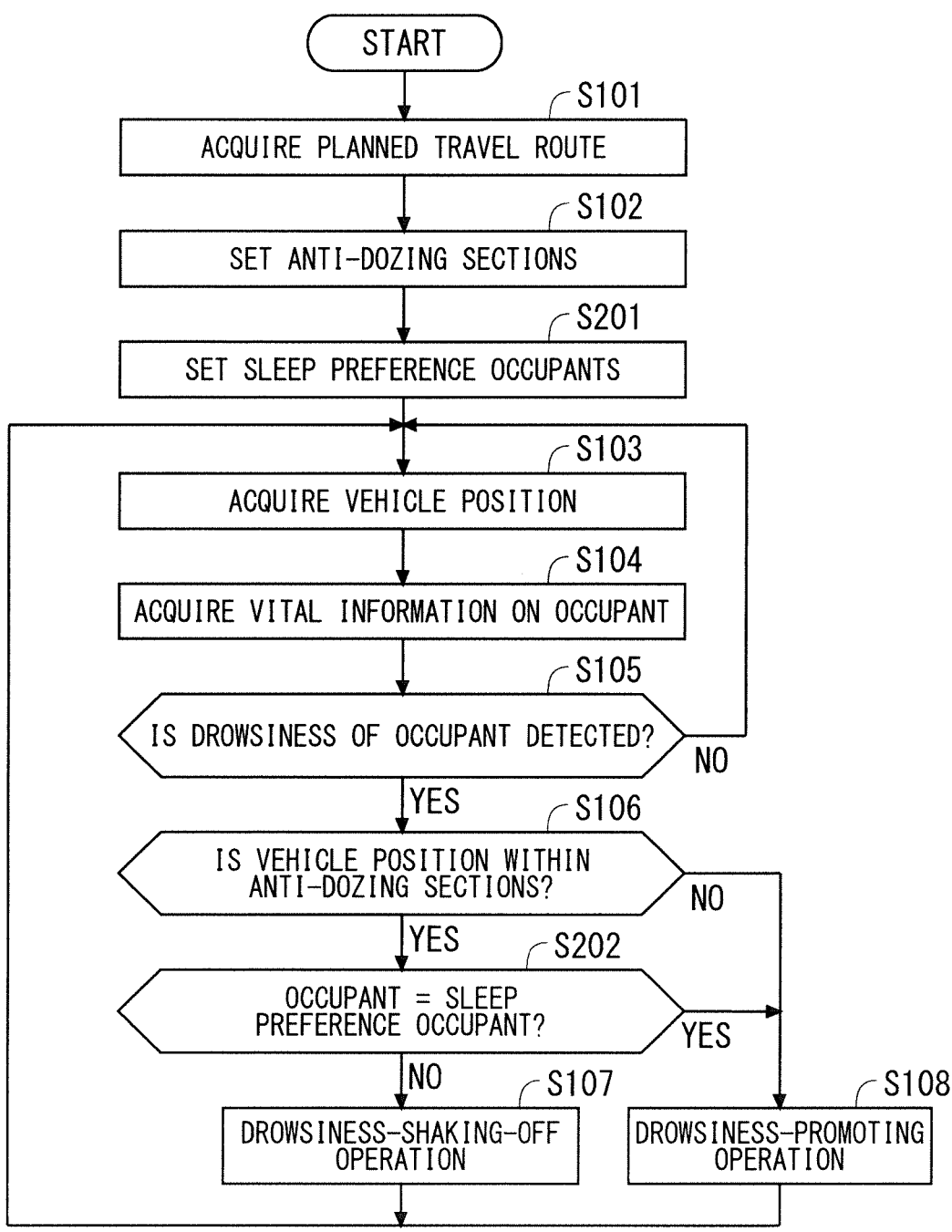
FIG. 9 is a flowchart illustrating operations of the vehicle-mounted equipment control device according to Embodiment 2.

FIG. 9 is a flowchart of operations of the vehicle-mounted equipment control device 10 according to Embodiment 2. The flowchart in FIG. 9 differs from the flowchart in FIG. 5 in that step S201 is inserted after step S102, and step S202 is inserted after step S106.

The operations of the vehicle-mounted equipment control device 10 will be described hereinafter with reference to FIG. 9. To simplify the description, the following description is given on the assumption that the number of occupants is one.

When the navigation device 22 has determined the planned travel route of the subject vehicle, the flowchart in FIG. 9 is started. First, the anti-dozing-section setting part 11 acquires the planned travel route from the navigation device 22 (step S101). The anti-dozing-section setting part 11 then sets anti-dozing sections on the planned travel route (step S102). Moreover, the sleep-preference-occupant setting part 15 sets sleep preference occupants as necessary (step S201).

Next, the vehicle-position acquisition part 12 acquires the position of the subject vehicle from the navigation device 22 (step S103). The drowsiness detector 13 acquires the vital information on the occupant from the vital-information acquisition device 23 (step S104).

On the basis of the vital information on the occupant, the drowsiness detector 13 determines whether the occupant is drowsy (step S105). At this time, if drowsiness of the occupant has not been detected (NO in step S105), the procedure returns to step S103 and steps S103 to S105 are repeatedly executed.

On the other hand, if drowsiness of the occupant has been detected (YES in step S105), the vehicle-mounted equipment controller 14 compares the position of the subject vehicle acquired in step S103 with the locations of the anti-dozing sections set in step S102 to determine whether the position of the subject vehicle is within the anti-dozing sections (step S106). At this time, if the position of the subject vehicle is within the anti-dozing sections (YES in step S106) and the occupant is not a sleep preference occupant (NO in step S202), the vehicle-mounted equipment controller 14 causes the vehicle-mounted equipment 30 to perform drowsiness-shaking-off operations in order to shake off the drowsiness of the occupant (step S107). If the occupant is a sleep preference occupant (YES in step S202), the vehicle-mounted equipment controller 14 causes the vehicle-mounted equipment 30 to perform drowsiness-promoting operations in order to promote the drowsiness of the occupant (step S108), even if the position of the subject vehicle is within the anti-dozing sections.

If the position of the subject vehicle is outside the anti-dozing sections (NO in step S106), the vehicle-mounted equipment controller 14 causes the vehicle-mounted equipment 30 to perform drowsiness-promoting operations in order to promote the drowsiness of the occupant (step S108).

After step S107 or S108, the procedure returns to step S103. However, in the case where the navigation device 22 has changed the planned travel route, the procedure returns to step S101 and resumes the processing.

In the case where there is a plurality of occupants, the processing of steps S103 to S108 (including step S201) described above is performed for each occupant.

In this way, it is possible to set an occupant who is excluded from targets for the drowsiness-shaking-off operation. This prevents the vehicle-mounted equipment control device 10 from interfering with, for example, drowsiness of occupants who need enough sleep such as infants or those in poor physical condition, and accordingly makes the vehicle-mounted equipment control device 10 convenient to use.

Embodiment 3

Embodiment 3 proposes a vehicle-mounted equipment control device 10 having a configuration capable of changing details of the drowsiness-promoting operations and the drowsiness-shaking-off operations performed by the vehicle-mounted equipment 30, depending on whether each occupant is drowsy (hereinafter, referred to as "in a half asleep state") or falls asleep (hereinafter, referred to as "in a sleep state"). The present embodiment is applicable to both of Embodiments 1 and 2.

In Embodiment 3, the drowsiness detector 13 is configured to determine not only whether each occupant is drowsy but also whether the occupant is in the half asleep state or in the sleep state, on the basis of the vital information (at least one of eye movements, eyelid movements, pulse, and brain waves) on the occupant. The vehicle-mounted equipment controller 14 is configured to change details of the drowsiness-promoting operations and the drowsiness-shaking-off operations that are performed by the vehicle-mounted equipment 30, depending on whether the occupant is in the half asleep state or in the sleep state.

In the case where the occupant is in the half asleep state, if the position of the subject vehicle is within the anti-dozing sections, the vehicle-mounted equipment controller 14 causes the vehicle-mounted equipment 30 to perform the drowsiness-shaking-off operations for shaking off the drowsiness of the occupant (excluding the case where the occupant is a sleep preference occupant according to Embodiment 2). If the position of the subject vehicle is outside the anti-dozing sections, the vehicle-mounted equipment controller 14 causes the vehicle-mounted equipment 30 to perform drowsiness-promoting operations for promoting the drowsiness of the occupant.

On the other hand, in the case where the occupant is in the sleep state, if the position of the subject vehicle is within the anti-dozing sections, the vehicle-mounted equipment controller 14 causes the vehicle-mounted equipment 30 to perform more effective drowsiness-shaking-off operations than when the occupant is in the half asleep state, in order to shake off the drowsiness of the occupant (excluding the case where the occupant is a sleep preference occupant according to Embodiment 2). If the position of the subject vehicle is outside the anti-dozing sections, the vehicle-mounted equipment controller 14 causes the vehicle-mounted equipment 30 to perform more effective drowsiness-promoting operations than when the occupant is in the half asleep state, in order to promote the drowsiness of the occupant.

The overall configuration and basic operations of the vehicle-mounted equipment control device 10 are the same as those in Embodiment 1 and 2, and therefore a description thereof is omitted.

FIG. 10 illustrates examples of the drowsiness-promoting operations and the drowsiness-shaking-off operations according to Embodiment 3. As illustrated in FIG. 10, details of the drowsiness-promoting operations and the drowsiness-shaking-off operations vary depending on whether the occupant is in the half asleep state and in the sleep state.

Conceivable examples of the drowsiness-promoting operation performed by the audio devices 31 when the occupant is in the half asleep state include turning down the volume of output sounds, decreasing the tempo of the playing music, and softening the tone of the playing music. Decreasing the tempo of the music includes switching the playing tune to a slower tempo tune. Softening the tone of the music includes switching the playing tune to a tune with a softer tone.

Conceivable examples of the drowsiness-promoting operation performed by the audio devices 31 when the occupant is in the sleep state include turning down the volume of output sounds, decreasing the tempo of the playing music, or softening the tone of the playing music to a level lower than before the occupant enters the sleep state (than when the occupant is in the half asleep state). Alternatively, the volume may be brought to zero, or the audio devices 31 may be powered off.

Conceivable examples of the drowsiness-promoting operation performed by the display devices 32 when the occupant is in the half asleep state include reducing the brightness of the screen.

Conceivable examples of the drowsiness-promoting operation performed by the display devices 32 when the occupant is in the sleep state include reducing the brightness of the screen to a level lower than before the occupant enters the sleep state. Alternatively, the screen may be turned off, or the display device 32 may be powered off.

Conceivable examples of the drowsiness-shaking-off operation performed by the audio devices 31 when the occupant is in the half asleep state include turning up the volume of output sounds, increasing the tempo of the playing music, and raising the tone of the playing music. Turning up the volume includes powering on the audio devices 31 that are in the off state. Increasing the tempo of the music includes switching the playing tune to a faster tempo tune. Raising the tone of the music includes switching the playing music to music with a stronger tone.

Conceivable examples of the drowsiness-shaking-off operation performed by the audio devices 31 when the occupant is in the half asleep state include turning up the volume of output sounds, increasing the tempo of the playing music, or raising the tone of the playing music to a level higher than before the occupant enters the sleep state.

In this way, the details of the drowsiness-promoting operations and the drowsiness-shaking-off operations performed by the vehicle-mounted equipment 30 are changed depending on whether the occupant is in the half asleep state or in the sleep state. This increases the effectiveness of controlling drowsiness of occupants.

It should be noted that the present invention can be implemented by freely combining each of the embodiments or by making a modification or omission on the embodiments as appropriate without departing from the scope of the present invention.

While the invention has been shown and described in detail, the foregoing description is in all aspects illustrative and not restrictive. It is therefore to be understood that numerous modifications and variations can be devised without departing from the scope of the invention.

EXPLANATION OF REFERENCE SIGNS

10: vehicle-mounted equipment control device, 11: anti-dozing-section setting part, 12: vehicle-position acquisition part, 13: drowsiness detector, 14: vehicle-mounted equipment controller, 15: sleep-preference-occupant setting part, 21: GPS receiver, 22: navigation device, 23: vital-information acquisition device, 30: vehicle-mounted equipment, 31: audio device, 32: display device, 50: processing circuit, 51: processor, 52: memory.

The invention claimed is:

1. A vehicle-mounted equipment control device comprising:
  a processor to execute a program; and
  a memory to store the program which, when executed by the processor, performs processes of,
    setting an occupant as a sleep preference occupant whose drowsiness does need to be shaken off;
    setting an anti-dozing section on a planned travel route of a subject vehicle;
    acquiring a position of the subject vehicle;
    detecting drowsiness of an occupant different from a driver in the subject vehicle;
    if drowsiness of the occupant has been detected when the position of the subject vehicle is within the anti-dozing section, controlling vehicle-mounted equipment to shake off the drowsiness, and
    if the occupant is a sleep preference occupant, controlling the vehicle-mounted equipment to promote the drowsiness, irrespective of whether the position of the subject vehicle is within or outside the anti-dozing section.

2. The vehicle-mounted equipment control device according to claim 1, wherein if drowsiness of the occupant has been detected when the position of the subject vehicle is within the anti-dozing section, the processor increases a volume or tempo of sound or a tone of music output from the vehicle-mounted equipment to a level higher than before the drowsiness of the occupant is detected.

3. The vehicle-mounted equipment control device according to claim 1, wherein if drowsiness of the occupant has been detected when the position of the subject vehicle is within the anti-dozing section, the processor increases brightness of an image displayed on the vehicle-mounted equipment to a level higher than before the drowsiness of the occupant is detected.

4. The vehicle-mounted equipment control device according to claim 1, wherein if drowsiness of the occupant has been detected when the position of the subject vehicle is within the anti-dozing section, the processor periodically changes a color of an image displayed on the vehicle-mounted equipment.

5. The vehicle-mounted equipment control device according to claim 1, wherein if drowsiness of the occupant has been detected when the position of the subject vehicle is outside the anti-dozing section, the processor reduces a volume or tempo of sound or a tone of music output from the vehicle-mounted equipment to a level lower than before the drowsiness of the occupant is detected.

6. The vehicle-mounted equipment control device according to claim 1, wherein if drowsiness of the occupant has been detected when the position of the subject vehicle is outside the anti-dozing section, the processor reduces brightness of an image displayed on the vehicle-mounted equipment to a level lower than before the drowsiness of the occupant is detected.

7. The vehicle-mounted equipment control device according to claim 1, wherein the processor switches whether to set the occupant as the sleep preference occupant or not, depending on a user's operation.

8. The vehicle-mounted equipment control device according to claim 1, wherein the processor automatically switches whether to set the occupant as the sleep preference occupant or not, on the basis of an age, sex, or physical condition of the occupant.

9. The vehicle-mounted equipment control device according to claim 1, wherein
  the processor determines whether the occupant is in a sleep state,
  if the occupant enters the sleep state when the position of the subject vehicle is within the anti-dozing section, the processor causes the vehicle-mounted equipment to perform an operation of waking the occupant up, and
  if the occupant is a sleep preference occupant, the processor causes the vehicle-mounted equipment to perform an operation of keeping the occupant in the sleep state irrespective of whether the position of the subject vehicle is within or outside the anti-dozing section.

10. The vehicle-mounted equipment control device according to claim 9, wherein if the occupant enters the sleep state when the position of the subject vehicle is within the anti-dozing section, the processor increases a volume or tempo of sound or a tone of music output from the vehicle-mounted equipment to a level higher than before the occupant enters the sleep state.

11. The vehicle-mounted equipment control device according to claim 9, wherein if the occupant enters the sleep state when the position of the subject vehicle is within the anti-dozing section, the processor increases brightness of an image displayed on the vehicle-mounted equipment to a level higher than before the occupant enters the sleep state.

12. The vehicle-mounted equipment control device according to claim 9, wherein
  if drowsiness of the occupant has been detected when the position of the subject vehicle is within the anti-dozing section, the processor periodically changes a color of an image displayed on the vehicle-mounted equipment, and
  if the occupant enters the sleep state when the position of the subject vehicle is within the anti-dozing section, the processor changes the color of the image displayed on the vehicle-mounted equipment in shorter cycles than before the occupant enters the sleep state.

13. The vehicle-mounted equipment control device according to claim 9, wherein if the occupant enters the sleep state when the position of the subject vehicle is outside the anti-dozing section, the processor reduces the volume or tempo of sound or a tone of music output from the vehicle-mounted equipment to a level lower than before the occupant enters the sleep state.

14. The vehicle-mounted equipment control device according to claim 9, wherein if the occupant enters the sleep state when the position of the subject vehicle is outside the anti-dozing section, the processor reduces brightness of an image displayed on the vehicle-mounted equipment to a level lower than before the occupant enters the sleep state.

15. The vehicle-mounted equipment control device according to claim 1, wherein the processor detects drowsiness of the occupant on the basis of one of eye movements, eyelid movements, pulse, and brain waves of the occupant.

16. The vehicle-mounted equipment control device according to claim 9, wherein the processor determines whether the occupant is in the sleep state, on the basis of one of eye movements, eyelid movements, pulse, and brain waves of the occupant.

17. A vehicle-mounted equipment control method comprising:
- setting an anti-dozing section on a planned travel route of a subject vehicle;
- setting an occupant as a sleep preference occupant whose drowsiness does need to be shaken off;
- acquiring a location of the subject vehicle;
- detecting drowsiness of an occupant different from a driver in the subject vehicle;
- if drowsiness of the occupant has been detected when the position of the subject vehicle is within the anti-dozing section, controlling vehicle-mounted equipment to shake off the drowsiness; and
- if the occupant is a sleep preference occupant controlling the vehicle-mounted equipment to promote the drowsiness, irrespective of whether the position of the subject vehicle is within or outside the anti-dozing section.

* * * * *